No. 639,125. Patented Dec. 12, 1899.
E. L. WINNETT.
SQUARE.
(Application filed May 21, 1898.)
(No Model.) 3 Sheets—Sheet 1.
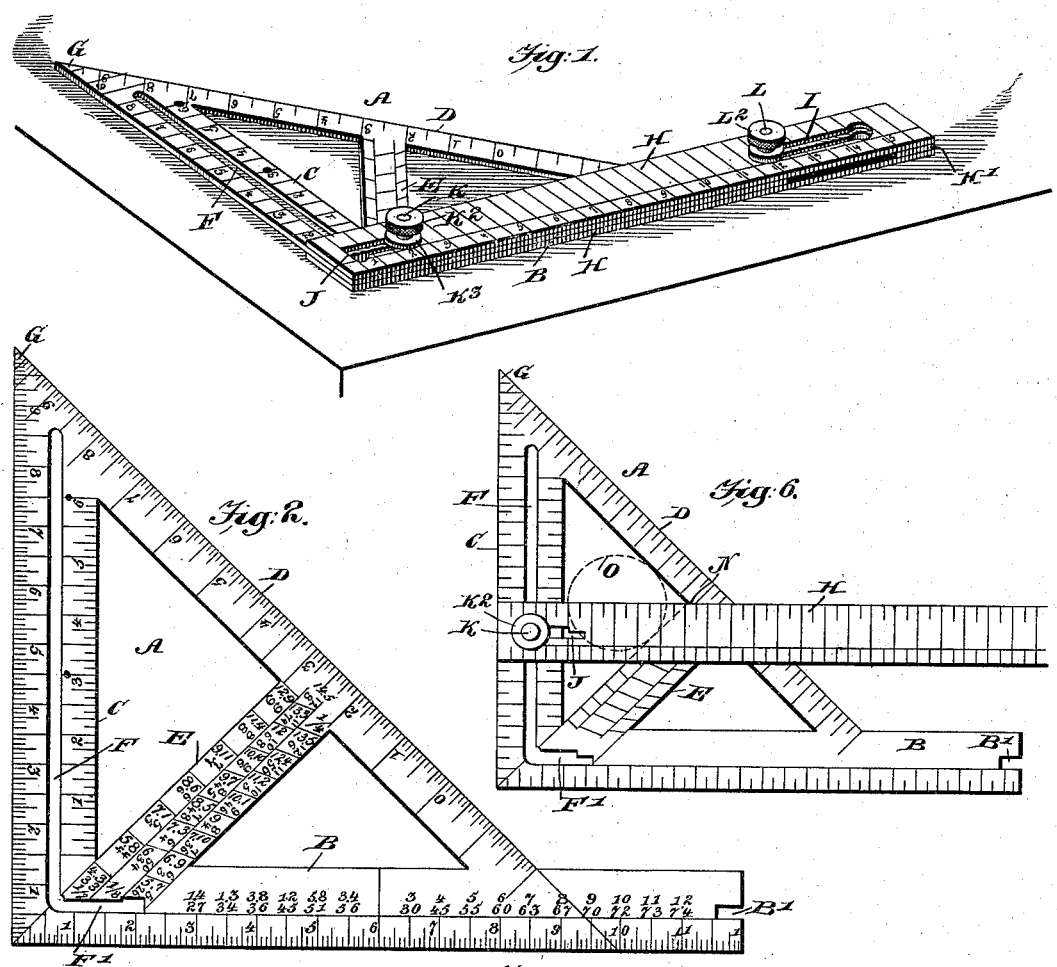
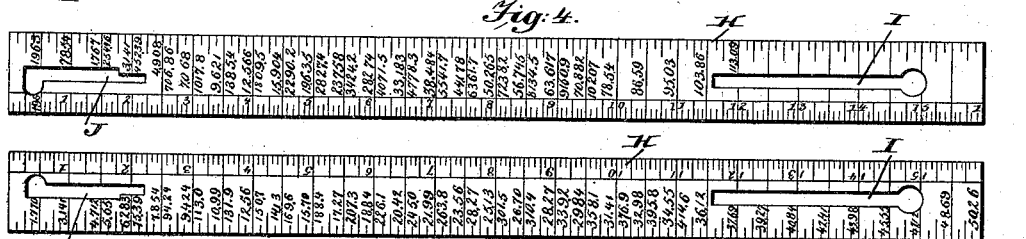
Witnesses
H. S. Dieterich
Chas. P. Brock
Inventor
E. L. Winnett
by _____ Attorney

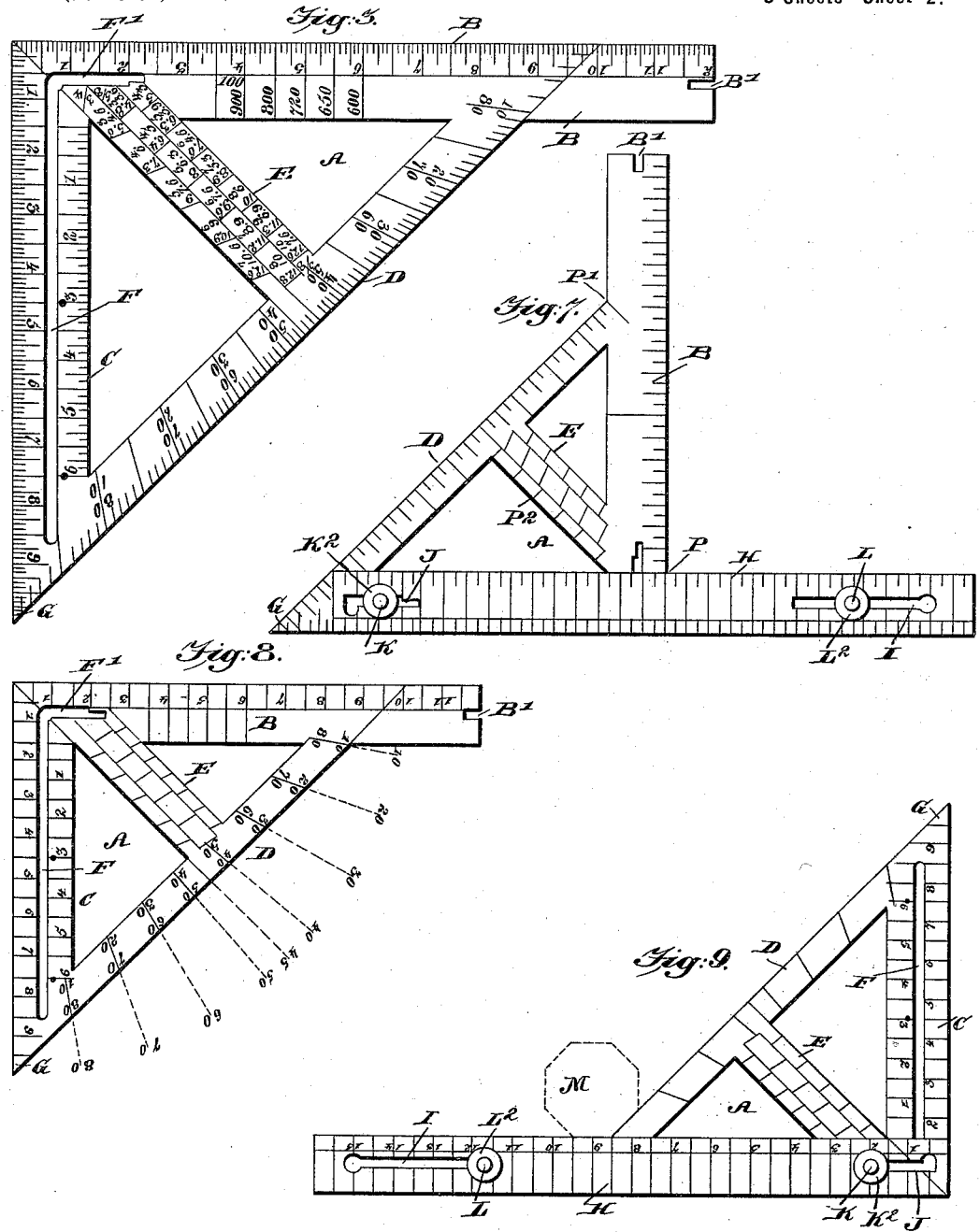

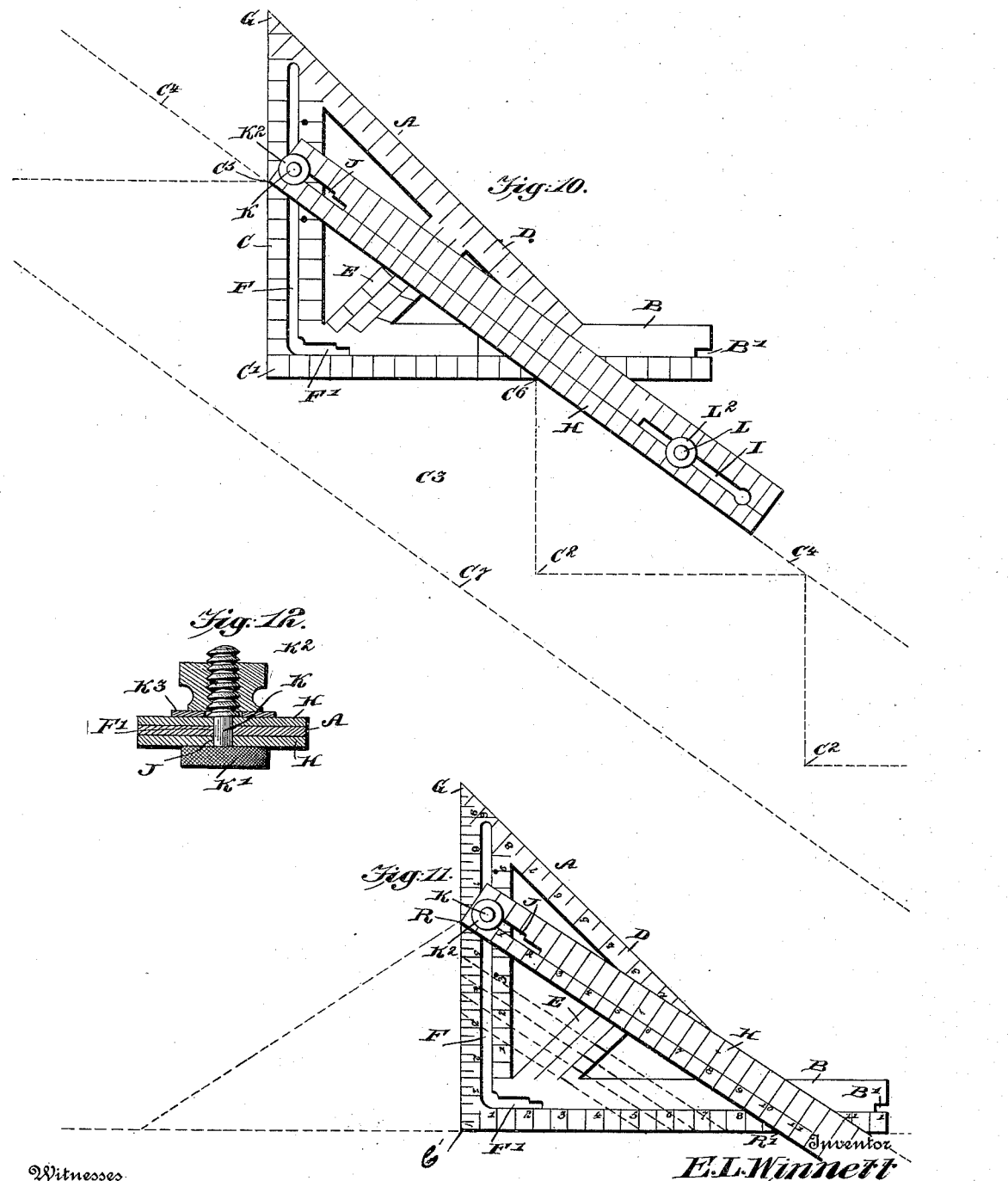

UNITED STATES PATENT OFFICE.

ELKAND LUKE WINNETT, OF VICKSBURG, MISSISSIPPI.

SQUARE.

SPECIFICATION forming part of Letters Patent No. 639,125, dated December 12, 1899.

Application filed May 21, 1898. Serial No. 681,356. (No model.)

*To all whom it may concern:*

Be it known that I, ELKAND LUKE WINNETT, residing at Vicksburg, in the county of Warren and State of Mississippi, have invented a new and useful Square, of which the following is a specification.

My invention relates to carpenters' squares, and has for its object to provide an instrument of this class by means of which a carpenter can lay out a large variety of work and be provided with the results of a large number of calculations at a glance, thus saving much valuable time heretofore expended in making such calculations and avoiding the tendency to err in making such calculations and the consequent loss of time and material due to carrying out such errors.

With this object in view my invention consists in a carpenter's square provided with an extensible, removable, and adjustable handle, whereby it can be converted into a variety of forms for various purposes, as hereinafter specified.

My invention further consists in the improved construction, arrangement, and combination of the parts of a carpenter's square, as will be hereinafter fully described, and afterward specifically pointed out in the claim.

In order to enable others skilled in the art to which my invention most nearly appertains to make and use the same, I will now proceed to describe its construction and operation, having reference to the accompanying drawings, forming part of this specification, in which—

Figure 1 is a perspective view of a carpenter's square and handle constructed in accordance with my invention. Fig. 2 is a view of one side of the square detached from the handle, illustrating, besides the regular graduated scales on the edges of the square, the scales giving the length of rafters for different pitches of roofs, the degrees indicating the angles the center lines of polygons will form to the base-line, and the scale indicating the manner of laying off rafters. Fig. 3 is a similar view of the opposite side of the square, illustrating the protractor, the scale for shingles, and one of the scales indicating the lengths of the rafters. Fig. 4 is a view of the arm or handle of the square detached, showing the scale for indicating areas of circles. Fig. 5 is a similar view of the opposite side of the handle, showing the scale for indicating circumferences of circles. Fig. 6 is a view illustrating the square with the arm adjusted thereon in position to form an instrument to indicate the centers of cylinders or shafts. Fig. 7 is a view of the square with the arm adjusted thereon in position for use as a try-square, a try-bevel, a miter, or a framing-square. Fig. 8 is a view of the square, illustrating the lines and figures on the brace-bar indicating degrees whereby a protractor is provided. Fig. 9 is a view of the square, illustrating the position in which the arm is to be adjusted to provide a tool for laying off octagons. Fig. 10 is a view showing the square and arm secured together in the position to form an instrument for laying off stairs and rafters, showing also the holes provided in the square to permit of its use as a scriber. Fig. 11 is a view showing the square and arm secured together in the position to form an instrument for laying off and indicating the length of rafters. Fig. 12 is a transverse sectional view through the square, the two plates of the arm, the adjusting-screw, the washer, and the millled adjusting-nut.

Like letters of reference mark the same parts wherever they occur in the different figures of the drawings.

Referring to the drawings by letter, A is a carpenter's square consisting of the part B, which I denominate the "base-bar," and a bar C, which I denominate the "upright," joined together at right angles, as is usual. In my square these bars B and C are connected by a diagonal brace D, which forms the hypotenuse of an isosceles triangle, and this brace-bar is connected to the bars B and C at their joint by a bar E. For the purposes of this specification I shall hereinafter denominate the bar B the "base," the bar C the "upright," the bar D the "brace," and the bar E the "radial" bar.

The slot F is cut centrally through the upright C from near the point formed by its junction with the brace D and near its right-angled joint with the base B, where said slot turns at right angles, as at F', and is run a short distance into the base B.

The brace D and upright C at their joint form an angle G; but the base B extends some distance beyond the point where the brace D joins it and is provided in its outer end with a notch B'.

The whole structure composing my carpenter's square, including the base B, upright C, brace B, and radial bar E, is cut from a plate of metal in a single piece.

H is a bar which for the purposes of this specification I shall denominate the "handle" of the square. It is of about the same width as the base B and upright C of the square and is composed of two plates of metal of about the same thickness as the square, separated at one end by a block H' of the same material, so that the square A can be clamped between the two plates when the handle is adjusted thereon. In one end of the handle H is a keyhole-slot I, while in its opposite end is a slot J. These slots I and J are cut in each of the plates forming the handle H and coincide with each other when the plates are properly secured together.

The handle and the square are adapted to be secured together in the several positions and for the purposes hereinafter described by means of a screw K, having a milled head K' and a milled nut K², the washer K³ being used under the nut. This screw in securing the handle and square together passes through the slots J in the handle and the slot F' in the square, the milled head K' engaging against the face of one plate of the handle, the washer K³ resting upon the other plate, and the milled nut K² being screwed up against the washer. The screw and the manner in which it clamps the handle and square together are illustrated in detail in Fig. 12, and a similar screw L, with milled head, washer, and milled nut L², is used, as occasion may require, to secure the opposite end of the handle to the outer end of the base B, said screw engaging in the keyhole-slot I in the handle and the notch B' in the base. By means of the slots, the notch, and the screws the handle and the square can be clamped together in a number of positions, in which they serve as instruments for various purposes, as will now be described.

In Figs. 1 and 9 I show the opposite sides of the combined instrument secured together as an integral body in position to be used for several purposes, in which position the instrument may be used for all the purposes for which the ordinary carpenter's square is used. These figures (1 and 9) show the opposite sides of the device in this adjustment, and for the reason that the uses to which they will be put in this position require no more than the ordinary graduated scale in inches and fractions of inches, which are provided on all ordinary carpenters' squares, it has not been deemed necessary to illustrate in these figures any of the scales with which the different parts are provided for special purposes to be hereinafter described and which are illustrated in other figures of the drawings. It follows from the fact, hereinbefore stated, that the brace D forms the hypotenuse of an isosceles right-angle triangle, the angle formed by the junction of the brace D with the extended portion of the base B or with the handle H in these figures is an angle of one hundred and thirty-five degrees. The brace D and handle H being provided at this angle with the usual graduated scale indicating inches and fractions of an inch and the angle at this point being the angle between the sides of an octagon, it follows that the instrument in this adjustment is well adapted for the laying out of an octagon at this angle, as shown in dotted lines at M in Fig. 9.

The next adjustment of the instrument to be described is that illustrated in Fig. 6. The space between the inner sides of the upright C, brace D, and radial arm E being the isosceles right-angle triangle, the handle H may be adjusted with its upper edge bisecting the angle N between the inside of the brace D and the side of the radial arm E, in which position it will lie parallel with the base B of the square and its upper line will bisect the circle of the cylinder or shaft O, placed in said angle, as shown. It follows then that the center of the shaft or cylinder can be at once ascertained and marked by bisecting its diameter on the upper line of the handle H in that adjustment.

In Fig. 7 I show the handle lying upon and parallel with the upright C, and the base B standing at a right angle thereto. In this adjustment the device may be used as an ordinary framing or try square, the angle P being a right angle and the handle H and base B being at right angles to each other. The device in this adjustment may be also used as a try-square for the same reason. It may be further used as a try-bevel, using the angle P' for this purpose. It may also be used to mark off miters, the edge P² of the radial arm E being at an angle of forty-five degrees to either the handle H or base B. The parts are secured in this adjustment by tightening up the screw K in the slot F in upright C and slot J in handle H and the screw L in the keyhole-slots I of the two plates of the handle.

In Fig. 10 I show the instrument in still another adjustment. To bring the parts to this position from that shown in Fig. 1, the screw K is loosened and the screw L disengaged from the slot B'. The angle C' of the square proper at the junction of the base B and upright C is then placed in one of the angles C² of the stringer C³ of a stairway, as shown in Fig. 10, and the handle adjusted to rest upon the points in the position shown in that figure. By ascertaining the entire length of the line C⁴ and dividing it by the number of inches indicated on the handle between the points C⁵ and C⁶ the number of steps can be readily ascertained.

In Fig. 11 I have shown the instrument adjusted in position for laying off roofs. In this figure the handle is adjusted, as shown at R, to the mark on the scale on the upright C indicating six inches from the bottom thereof, and the lower end of the handle crossing the lower edge of the base B at the point R' in the scale thereon indicating nine inches. In this position the edge of the upright C to the point R will indicate a six-foot-pitch roof, while the lower line of the base from the angle C' to the point R' will indicate one-half of the eave-line of a roof having a stretch of eighteen feet, the pitch six feet being one-third the stretch of the roof, from which, as is well known, the term "one-third" arises. The length of the rafter in feet to the eaves of the house will be indicated in inches on the scale on the lower side of the handle from the point R to the point R'. In this adjustment the lower line of the handle H will cut across the radial arm E on a line in a scale placed in the center of said radial arm, as shown in Fig. 2, which scale indicates the length of feet in the stretch and pitch of one-third-pitch roofs and, in feet and inches in the same compartment or division of the scale, of the rafter required for that size one-third-pitch roof from the ridge to the eaves. For instance, by inspection of Fig. 2 it will be seen that one compartment of that scale contains the figures "9 6" and "10 10." This indicates that when the handle is adjusted on the scale in the position shown in Fig. 11, as has been fully explained hereinbefore, that the pitch of six feet half the width the stretch of the roof nine feet, that the length of the rafter indicated on the lower line of the handle will be ten feet and ten inches, and in this position the lower line of the handle will coincide with the upper line of the compartment of the scale just described. The further application of this adjustment to ascertain the length of rafters in one-third-pitch roofs will be understood without further explanation. In the scale on the left upper edge of the radial arm E, as illustrated in Fig. 2, are shown the height and pitch and half-length of stretch of roof, with the length of rafter required in half-pitch roofs, and in the left lower column on said radial arm E is shown a similar scale containing figures to indicate the height of pitch, half-length of stretch, and length of rafter required in one-fourth-pitch roofs. On the left-hand half of the base B, as shown in Fig. 2, above the usual graduated scale showing inches and fractions thereof, will be seen a scale containing in the upper line the figures "1-4," "1-3," "3-8," "1-2," "5-8," and "3-4," which are intended to indicate the fractions one-fourth, one-third, three-eighths, one-half, five-eighths, and three-fourths. The line of figures immediately below these are "27," "34," "36," "45," "51," and "56." This line is intended to represent degrees, and the scale as a whole is intended to indicate the number of degrees in the angle between the roof-stretch line from eave to eave and the rafter for roofs of the various pitches indicated by the fractions. This is for the purpose of getting the cuts on the rafters of the several pitches indicated, and in order to get these cuts the handle of the square will be so adjusted as to lie upon the mark indicating the proper degree on the protractor-scale formed on the opposite side of the brace D, as is clearly shown in Fig. 3. When so adjusted according to the number of degrees marked in this scale, the handle will be at the proper angle to the square to mark out upon the rafter the cut necessary for the respective pitches of roofs. On the right end of the base D is a scale consisting of another double row of figures, the upper row consisting of the numbers from "3" to "12," consecutively arranged from left to right, and the lower row consisting of numbers "30, 45, 55, 60, 63, 67, 70, 72, 73, 74." This scale is for the purpose of giving the number of degrees to which the handle must be adjusted on the protractor, as previously stated, to give the proper angle for marking the center or diagonal lines of polygons containing the number of sides indicated by figures in the upper row, the figures in the lower row indicating the number of degrees required in each instance. In addition to the protractor laid out on the opposite side of the square on the brace D, as shown in Fig. 2, there are other scales as follows: On the radial arm E are three scales of the same class as those on the opposite side of said radial arm. (Shown in Fig. 2 and hereinbefore described.) The scale in the lower left-hand column indicates the height of pitch and one-half the stretch, with the length of rafter required for three-fourth-pitch roofs, and the upper right-hand column the same for three-eighths-pitch roofs. On the base B in the same figure are shown a series of numbers—to wit, "600, 650, 720, 800, 900"—and in the same compartment with the "900" the number "100" is shown. It will be noticed that the compartments containing these numbers are divided by lines which are combinations of the lines in the graduated scale, indicating, respectively, "6," "5½," "5," "4½," and "4." The object of this scale is to indicate the number of shingles required to cover a surface of one hundred square feet, commonly known as a "square," the length of exposure to the weather of said shingles being indicated by the numbers hereinbefore recited as marking inches in the regular graduated scale. Thus when the shingles are laid four inches to the weather, nine hundred will be required to cover a square. When laid four and one-half inches to the weather, eight hundred will be required, and so on, six hundred being required when they are laid six inches to the weather.

On one side of the handle, as shown in Fig.

4, opposite the ordinary graduated scale indicating inches and fractions thereof, I have arranged a scale in compartments divided by extensions of the lines in the regular graduated scale which indicate inches and half-inches. In each of these compartments except the first three to the left will be found two numbers. The one to the left of the first dividing-line, being ".1963," is intended to indicate the area of a circle one-half inch in diameter. The number on the second line, which is an extension of the line indicating one inch on the graduated scale, is ".7854," which is the area of a circle one inch in diameter. In the third and fourth compartments, on opposite sides of the division-line which is an extension of the line indicating one and one-half inches on the graduated scale, will be found the numbers "1.767, 254.46." The first number is to indicate the area, in square inches, of a circle one and one-half inches in diameter and the second number is to indicate the area, in square inches, of a circle one and one-half feet in diameter. The balance of the scale is arranged in the same way, the area, in square inches, of the circle whose diameter is indicated by the extension of the graduated-scale line in inches being placed to the left of the line and the area, in square inches, of the circle of the diameter in feet indicated by the same line, the arrangement extending up to a circle of ten inches in diameter, after which, to the right, the area of the circles having diameters in feet indicated by the extended lines are omitted on account of the limited space in which to place the figures. On the opposite side of the handle, as illustrated in Fig. 5, besides the ordinary graduated scale indicating inches and fractions of inches, is a scale in all respects like that just described, as illustrated in Fig. 4, except that the number to the left of the line which is an extension of that line in the graduated scale indicating four inches is intended to show the circumference of a circle having a diameter of four inches and the number to the right of the line to show, in square inches, the circumference of a circle four feet in diameter.

From the extended description of the scale illustrated in Fig. 4 this scale will be readily understood without further explanation.

From the foregoing description it will be obvious that I have provided for a carpenter or other mechanic at a not extravagant cost an instrument which will be invaluable in the performance of his work, with which by the simple adjustment of the parts, as hereinbefore described, he will be enabled to perform any of the difficult operations hereinbefore described by simple mechanical work and with mechanical accuracy, thereby avoiding the large expenditure of time and labor heretofore necessary and preventing the errors which were almost unavoidable in making the difficult calculations for such work.

Having thus fully described my invention, what I claim as new, and desire to secure by Letters Patent of the United States, is—

The herein-described instrument consisting of the bar B, bar C, brace D, and radial bar E cut or stamped from a metal sheet in a single piece, the bar B, being longer than the bar C, and the upper end of the bar C, terminating in a point inclined on the inside at an angle of forty-five degrees, provided with the right-angled slot F extending nearly the whole length of the bar C and centrally into the bar B to a point slightly beyond the inner line of the bar C, the bar B having the notch B' in its outer end, in combination with the handle H, composed of two plates of material with a separating-block between them at one end and having a keyhole-slot I near one end, a slot J near the other, and the clamping-screws and nuts adapted to secure the parts together in various adjustments, the parts being suitably furnished with scales, figures and lines, whereby the instrument is capable of use, in its various adjustments, as a carpenter's square, a framing or try square, a try-bevel, a protractor and a tool for laying off polygons, stairs or roofs, finding centers of circles, or the central lines of polygons, all substantially as and for the purposes set forth.

ELKAND LUKE WINNETT.

Witnesses:
FRED. W. BEAUMANN,
F. C. HENDERSON.